(12) United States Patent
Burkhard

(10) Patent No.: US 6,945,130 B2
(45) Date of Patent: Sep. 20, 2005

(54) BALANCE COMPRISING A HOUSING WITH AN EXCESS PRESSURE

(75) Inventor: Hans Rudolf Burkhard, Wila (CH)

(73) Assignee: Mettler-Toledo GmbH, Greifensee (CH)

( * ) Notice: Subject to any disclaimer, the term of this patent is extended or adjusted under 35 U.S.C. 154(b) by 0 days.

(21) Appl. No.: 10/276,504

(22) PCT Filed: May 16, 2001

(86) PCT No.: PCT/IB01/00842

§ 371 (c)(1),
(2), (4) Date: Nov. 15, 2002

(87) PCT Pub. No.: WO01/90708

PCT Pub. Date: Nov. 29, 2001

(65) Prior Publication Data

US 2003/0115976 A1 Jun. 26, 2003

(30) Foreign Application Priority Data

May 25, 2000 (DE) .......................................... 100 25 712

(51) Int. Cl.$^7$ ............................................. G01G 21/28
(52) U.S. Cl. ..................................... 73/865.6; 177/243
(58) Field of Search ............................... 177/238, 239, 177/180, 243; 73/865.6

(56) References Cited

U.S. PATENT DOCUMENTS 4,698,456 A * 10/1987 Hamacher ................. 174/11 R

FOREIGN PATENT DOCUMENTS

| DE | 176287 | 1/1906 |
|----|--------|--------|
| DE | 8508424 | 4/1986 |
| DE | 4125321 | 2/1993 |
| DE | 4418158 | 11/1995 |
| EP | 0333360 | 9/1989 |

OTHER PUBLICATIONS

Patent Abstracts of Japan, vol. 011, No. 009 (P–534), Jan. 10, 1987 & JP 61 186821 A (Kubota LTD), Aug. 20, 1986.

German Industrial Standard DIN EN 50 016.

* cited by examiner

*Primary Examiner*—Charles Garber
(74) *Attorney, Agent, or Firm*—Friedrich Kueffner

(57) ABSTRACT

An electronic balance with a housing (1) that can be put under an above-ambient pressure, for example for the purpose of using the balance in a hazardous environment where a risk of explosion exists, has an inlet (21) for a gas, in particular compressed air. The balance also has a horizontal passage through the housing (1) for a force-transmitting rod member (6) that is coupled to the load-hanger element (12) of the balance. The housing (1) has an opening (9) through which the force-transmitting rod member (6) passes in a substantially horizontal direction without making contact; and the opening (9) also forms an outlet for the gas.

14 Claims, 4 Drawing Sheets

BALANCE COMPRISING A HOUSING WITH AN EXCESS PRESSURE

BACKGROUND OF THE INVENTION

The invention relates to an electronic balance with a housing that can be put under an above-ambient pressure (also referred to as over-pressure). Balances of this kind are used, e.g., for applications in areas where an explosion hazard exists.

Hazardous areas with an increased risk of explosions are characterized by the fact that they contain an atmosphere composed of a mixture of normal ambient air and gases that can be brought to ignition or even explosion by sparks (for example in switches or electrical contacts) or by elevated temperatures.

Protective measures for electrical equipment to allow its use in the presence of an explosion hazard are known under different types according to the nature of the technical solution chosen by the manufacturer, such as:
- a pressure-proof encapsulation provided by the housing, where the latter is designed to withstand the explosion and associated pressure of an explosive mixture inside the housing and to prevent it from spreading to the surrounding atmosphere;
- an intrinsically safe design of the equipment, meaning that the energy level in the electrical circuits is kept low enough to prevent the occurrence of sparks, arcs or temperature increases of a size that could cause ignition;
- a sand encapsulation, where the housing is filled with a fine granular material, so that an arc occurring inside the housing cannot ignite an explosive atmosphere surrounding the housing;
- a pressurized encapsulation, where a protective gas such as compressed air is maintained at an above-ambient pressure inside the housing to reduce the extent to which the surrounding atmosphere can enter into the housing.

A method and apparatus for operating an electrical device in a hazardous atmosphere are described in DE-A-44 18 158, proposing the use of a rinse gas flowing through a housing that is protected according to a concept of pressurized encapsulation. The above-ambient pressure inside the housing can be kept at a desired level by monitoring the rinse gas that flows out of the housing through a gas outlet and by regulating the flow of gas into the housing by means of a proportional valve.

The application of another of the aforementioned types of protection is disclosed in DE-A-34 37 959. This reference proposes an intrinsically safe design for the weighing system, the signal-processing unit, and the indicator unit. The conductive connections are limited to a low voltage, and the power supply unit is accommodated in a separate housing. Current-carrying conductors and plug connections are designed intrinsically safe with regard to explosion hazards.

The European Patent Application EP-A-0 018 656 describes a commercially available type of balance in which the weighing system is enclosed in a pressure-proof housing, where the opening in the housing for the vertical mechanical connecting member is designed as a narrow and relatively long, contact-free passage.

However, as a disadvantage of the last-mentioned concept, since the inside of the housing shares the hazardous atmosphere of the outside environment, the balance can still be destroyed if an explosion is ignited inside the housing, even though the explosion and associated pressure are prevented from spreading to the outside. This drawback can be overcome through the concept of a pressurized encapsulation of the balance, where a constant over-pressure is maintained by the inflow of a gas, e.g., compressed air, which prevents to a large extent that the hazardous explosive atmosphere of the outside environment could enter the inside of the housing.

In JP-2213730, a balance with a Roberval-type weighing mechanism is described which has a housing that can be put under an above-ambient pressure, with a horizontal passage through the housing for the force-transmitting rod member. The passage is provided with a bellows-type seal. The forces caused by the internal pressure act on the enclosed portion of the force-transmitting part as well as on the bellows-type seal, but the upward and downward forces cancel each other, so that pressure fluctuations inside the housing have no effect on the measured values.

The arrangement just described is not suitable for highly sensitive balances such as for example precision balances, not to mention analytical balances where a weighing accuracy in the microgram range may be required, because the bellows-type seal exerts reactive forces—including vertically directed force components—on the force-transmitting rod member, a problem that manifests itself in particular through a hysteresis effect, i.e., a difference in the measured results depending on whether the weighing load on the balance is increasing or decreasing. If one were to choose a thinner material for the bellows in an attempt to reduce the aforementioned forces, the bellows would lose the stability necessary to hold its own weight and maintain its shape, and/or it could bulge as a result of the internal pressure. Added to this problem is the difficulty of maintaining a prescribed constant internal pressure, particularly in the presence of temperature fluctuations.

OBJECT OF THE INVENTION

The present invention therefore has the objective to provide a design concept for an electronic balance with a housing that can be put under an above-ambient internal pressure and meets the requirement that a desired atmospheric composition can be achieved inside the housing without causing an unacceptable effect on the weighing result.

SUMMARY OF THE INVENTION

According to the invention, the problem just stated is solved in a balance with the characterizing features of claim 1.

An electronic balance with a housing that can be put under an over-pressure relative to the surrounding atmosphere, for example in an explosive environment, has an inlet for a gas, in particular compressed air, as well as a horizontal passage through the housing wall for a force-transmitting rod member that is coupled to the load-hanger element of the balance—i.e., the intermediate member between the load sensor and the load-receiving part of the balance—, wherein the housing of the balance has an opening through which the force-transmitting rod member passes in a substantially horizontal direction, without contact between the force-transmitting rod member and the contours of the opening, and wherein the opening also serves as outlet for the gas.

The continuous flow of gas through the housing prevents the possibility of a gradual intermixing with the explosive atmosphere on the outside, particularly in a case where the housing is not completely sealed. It may also be desirable for other reasons to maintain a specific composition of the gases surrounding the weighing module, e.g., to slow down the processes of corrosion and/or aging, or to operate the equipment in an environment with a high dust concentration.

However, particular attention should be given to the requirement to keep the gap between the force-transmitting rod member and the contour of the passage as narrow as possible in order to maintain the pressure in the balance housing without a high gas-flow rate that could cause turbulence inside the housing. In a highly sensitive balance, the forces exerted against the force-transmitting rod member by the gas flow between the force-transmitting rod member and the contour of the outlet passage need to be small enough in comparison to the weight differences that are detectable by the balance, so that the forces caused by the gas flow will not introduce fluctuations in the weighing result. Based on this consideration, the cross-sectional area of the passage opening for the force-transmitting rod member that extends horizontally through the housing, or for a portion of the force-transmitting rod member in the area of the passage, has to be designed on the one hand to allow enough play for the vertical movement of the force-transmitting rod member under the weight of a sample that is being weighed, and on the other hand to keep the flow rate of the gas streaming through the passage sufficiently small.

In an advantageous embodiment of the invention, particularly suitable for a balance where the load receiver is arranged above or below the balance, an adapter flange is provided as a part of the housing and installed on the latter in tight contact. The substantially vertical walls of the flange have openings for the substantially horizontal passage of the force-transmitting rod member. In another preferred embodiment, the horizontal part of the force-transmitting rod member extends over at least the entire width of the load-hanger element of the balance and is attached to both sides of the load-hanger element. The mid-portion of the horizontal part has a coupling member for the load that is to be weighed. With this arrangement a higher degree of stability can be achieved for the force-transmitting rod member.

Another advantageous embodiment of the invention provides means for determining the over-pressure inside the housing. The pressure-determining means are connected to a regulating unit which controls the gas flow rate to ensure a constant level of over-pressure. It is desirable to maintain a constant level of over-pressure inside the housing in order to reduce or entirely eliminate flow rate fluctuations caused by pressure fluctuations, because a fluctuating flow rate could lead to instabilities in the weighing result.

The pressure sensor could also be arranged outside of the balance housing, for example in the gas supply conduit. In a further developed concept that is applicable to all embodiments of the invention, one could provide an arrangement where the electrical operating elements installed in the housing are switched to a voltage-free state in case of a malfunction, for example if the pressure inside the housing falls below a predefined threshold level.

BRIEF DESCRIPTION OF THE DRAWING

In the following, preferred embodiments of the invention will be described for a configuration where the load is suspended below the balance. The description is based on the attached schematic drawings, wherein.

DESCRIPTION OF PREFERRED EMBODIMENTS

It is considered self-evident that the solution provided by the present invention can also be applied to balances of other design categories that are not discussed in detail herein.

Figure 1:
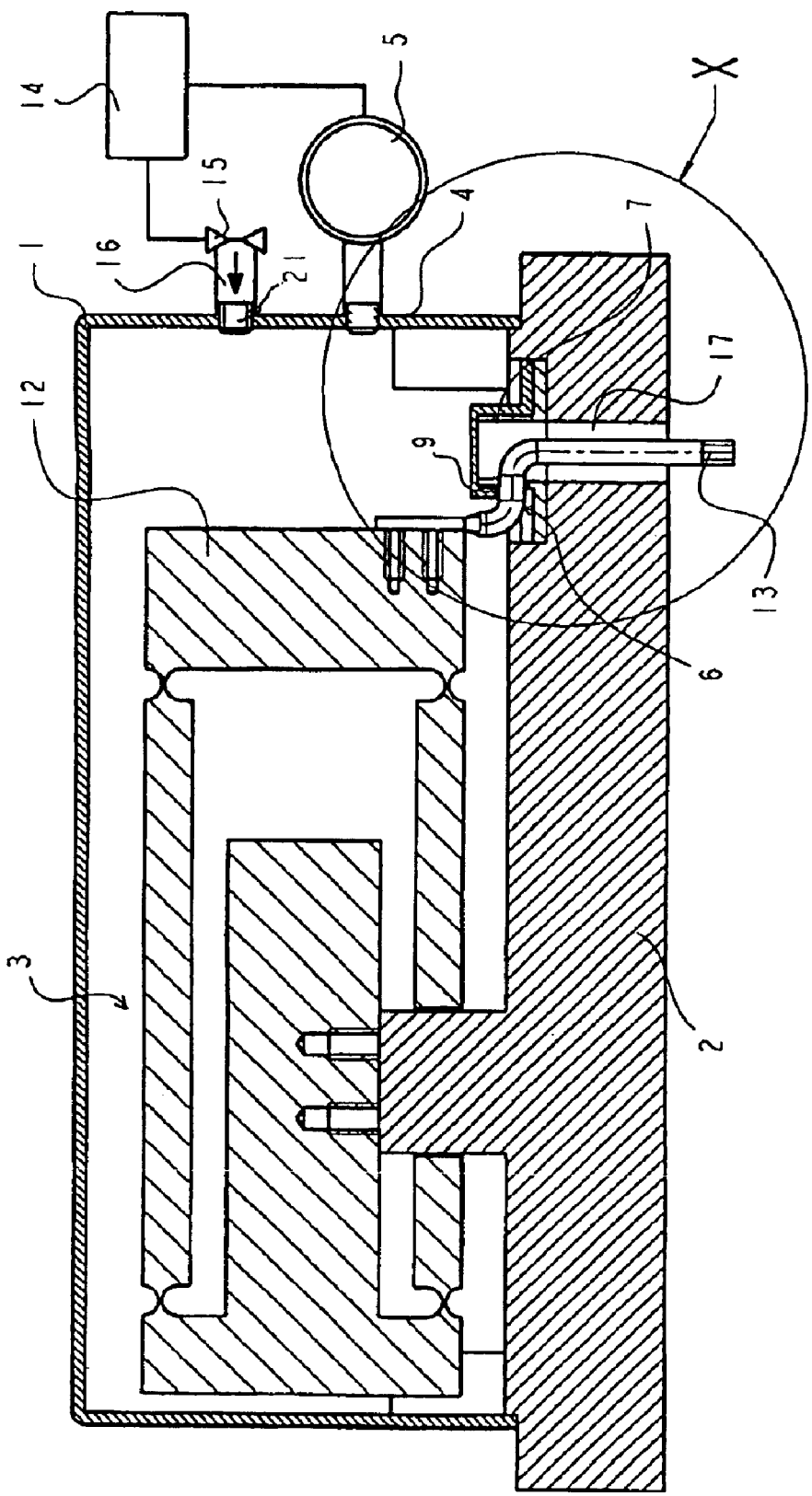
FIG. 1 shows a vertical section through a balance with a pressurized housing, in a side view.

The weighing module of a balance of a hanging-pan configuration—represented schematically by the Roberval mechanism 3 in FIG. 1—is surrounded by a housing 1 that is substantially sealed against the surrounding environment, mounted in a substantially gas-tight manner on a housing base 2. A supply conduit 16 for gas, in particular for compressed air, is likewise connected to the housing in a gas-tight manner, with the flow direction being indicated by an arrow. The compressed air enters the housing 1 through an inlet 21, with the possibility of controlling the flow rate by means of a valve 15. The housing further has an opening 4 for the tightly sealed installation of a pressure sensor 5 that serves to determine the pressure inside the housing 1. However, the pressure sensor 5 can also be installed in the interior of the balance housing, or in the gas supply conduit 16. The important point is that the maintenance of a constant over-pressure can be measured and monitored, so that in case of a malfunction, for example if the pressure falls below a predefined threshold, the electrical operating elements installed in the housing can be switched to a voltage-free state. This function as well as the regulation of a defined amount of over-pressure in relation to the ambient atmosphere is performed by a regulating unit 14 that is electrically connected to the balance and also controls the valve 15. The electrical connections to the valve 15 and the pressure sensor 5 are either designed to be intrinsically safe with respect to explosion hazards, or the valve 15 and the electrical connections to the pressure sensor 5 are arranged outside of the hazardous area. As an alternative, it would also be possible to arrange the regulating unit 14 together with the pressure sensor 5 in the space inside the balance housing as parts of the balance. It is likewise possible to arrange the regulating unit 14 entirely outside of the hazardous area. Also, one could simply choose a system with the pressure sensor 5, the regulating system 14 and the valve 15 designed as purely pneumatic elements, which would per se ensure the explosion safety of these components.

Figure 2:
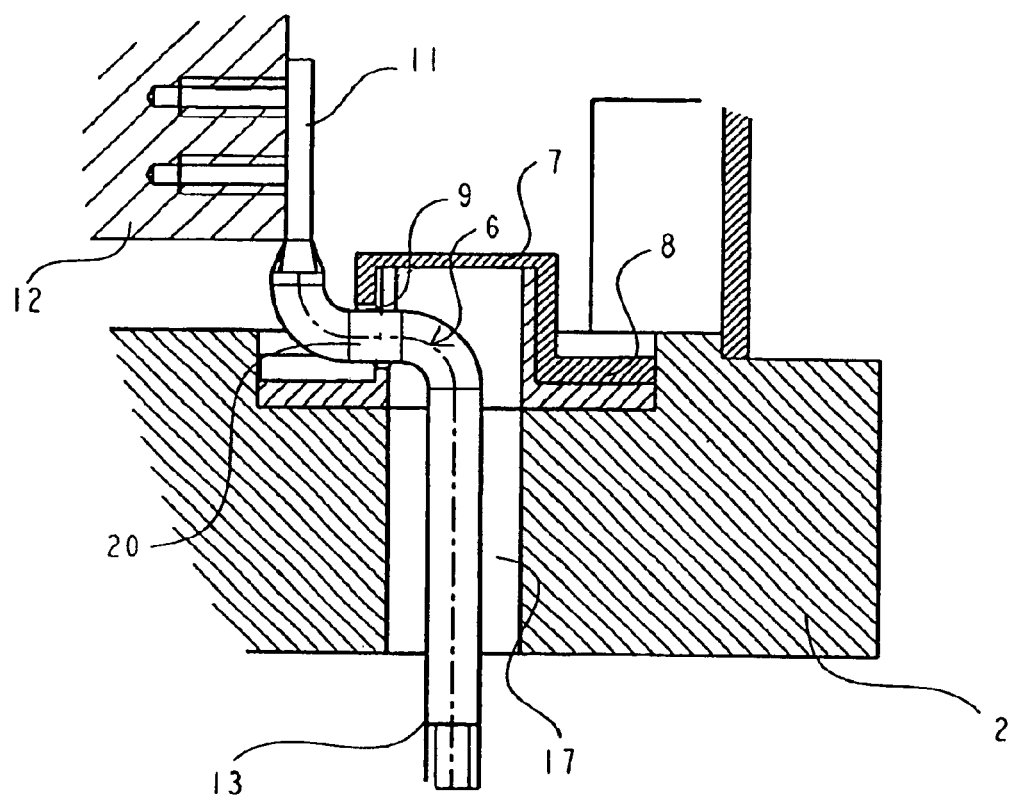
FIG. 2 shows an enlarged view of the detail X of FIG. 1, representing the outlet for a protective gas in the area of the horizontal passage through the housing for the force-transmitting rod member.

The arrangement for introducing the force into the balance is located in the bottom portion of the housing. As shown in FIG. 2, which represents an enlargement of the detail X of FIG. 1, the force-transmitting rod member 6 leads through a bore hole 17 in the housing base 2. The bore hole 17 is closed off at the top by a cylindrical adapter flange 7. The adapter flange is closed at its upper end and has a disc-shaped rim 8 at the lower end that is tightly attached to the rest of the housing base 2. In the area of its vertical cylindrical wall, the adapter flange 7 has a lateral opening 9 to provide a horizontal passage for the force-transmitting rod member 6. The opening 9 at the same time forms the outlet for the compressed air. The force-transmitting rod member 6 passes through the opening 9 without contact and is substantially centered in the opening. In the illustrated embodiment, the force-transmitting rod member 6 is formed of one piece, bent into an S-shape for the passage through the opening 9 which in this case is of a circular shape. The force-transmitting rod member 6 in FIG. 2 has a round profile except in the portion 11 that is attached to the load-hanger element 12 where the force-transmitting rod member 6 has a rectangular profile, which is more suitable for a force-tight connection.

The cylindrical horizontal mid-portion 20 of the force-transmitting rod member 6 has a diameter that is a few tenths of a millimeter smaller than the passage opening 9. The vertical play of the horizontal mid-portion 20 in the passage opening needs to be larger than the amplitude of the downward vertical movement caused by the weight of the sample that is to be weighed on the balance. The opening 9 can also have an oval shape with the longer axis of symmetry oriented vertically. However, the overall size of the gap surrounding the force-transmitting rod member 6 in the passage needs to be kept small enough so that the pressure inside the balance housing can be maintained without requiring a high rate of gas flow which could cause turbulence inside the housing and introduce errors in the weighing result.

Figure 3:
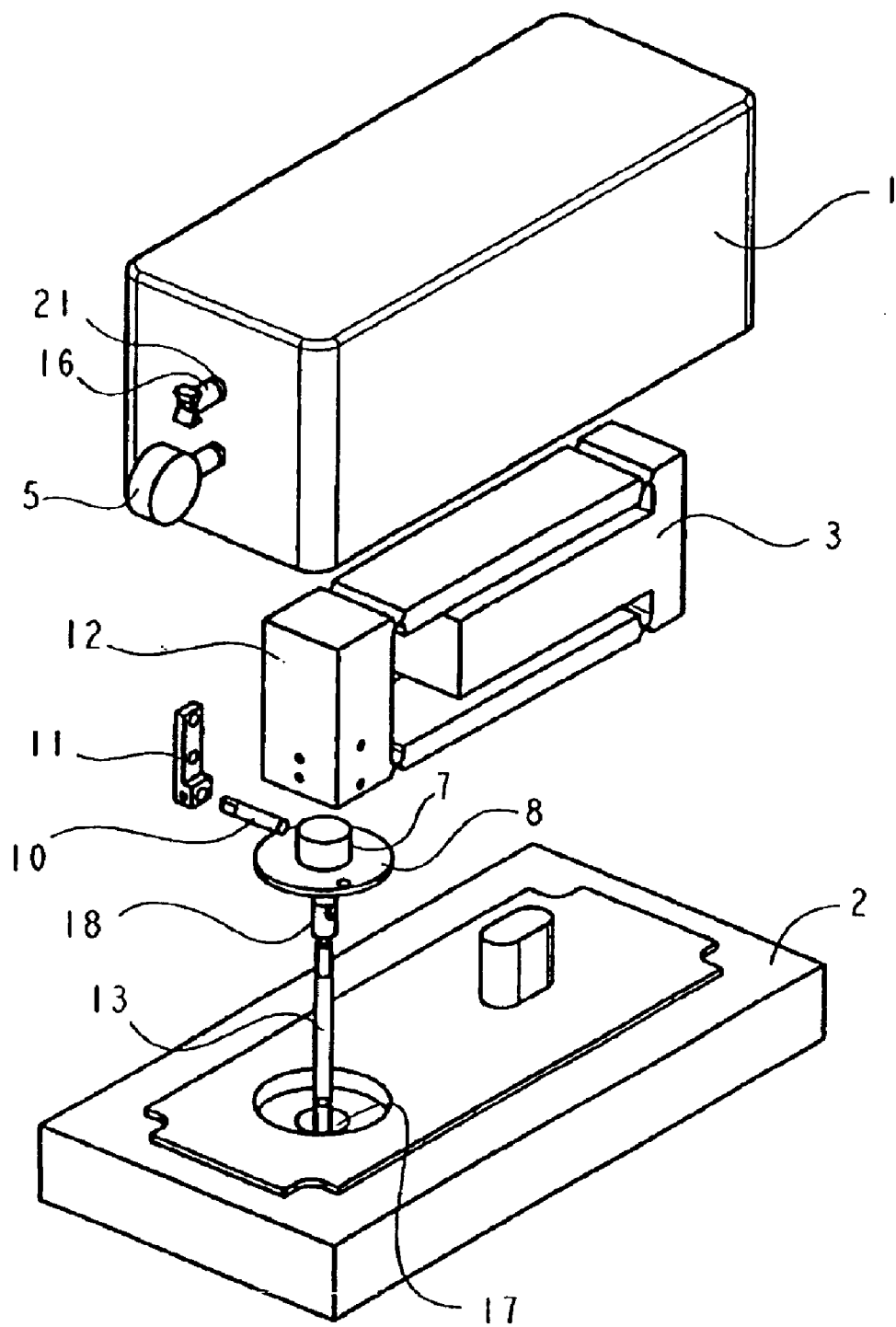
FIG. 3 represents a three-dimensional perspective view of the essential components of a balance with a pressurized housing with another configuration of the force-transmitting rod member.

In the embodiment of FIG. 3, where the force-transmitting rod member 6 is composed of several individual parts, the force-transmitting rod member 6 has an intermediate section 10. At the end that protrudes into the interior of the balance housing, the intermediate section 10 is tightly screwed to a vertical connector element 11, with the section 10 and the connector element 11 running at a 90° angle to each other. The intermediate section may be chamfered in the area of the connection to provide a better fixation of the intermediate section 10 in the vertical connector element 11. The vertical connector element 11, in turn, is attached to the load-hanger element 12 of the balance, in the illustrated case through a lateral, force-tight connection. At the other end, which is outside the balance housing, the intermediate section 10 is fixedly connected through a coupler element 18 to the load-coupling piece 13 which extends vertically downward and receives the weighing load.

It is self-evident that the adapter flange 7 can be configured differently from the cylindrical shape shown in the drawing. Likewise, the intermediate section 10 of the force-transmitting rod member 6 can have a rectangular, oval, hexagonal or other profile shape rather than the round profile shown. A rectangular profile is suggested in particular if the force-transmitting rod member 6 is made as a single, integral part, in which case the adapter flange 7 has to be configured in at least two parts to allow the insertion of the force-transmitting rod member 6 in the assembly process.

Figure 4:
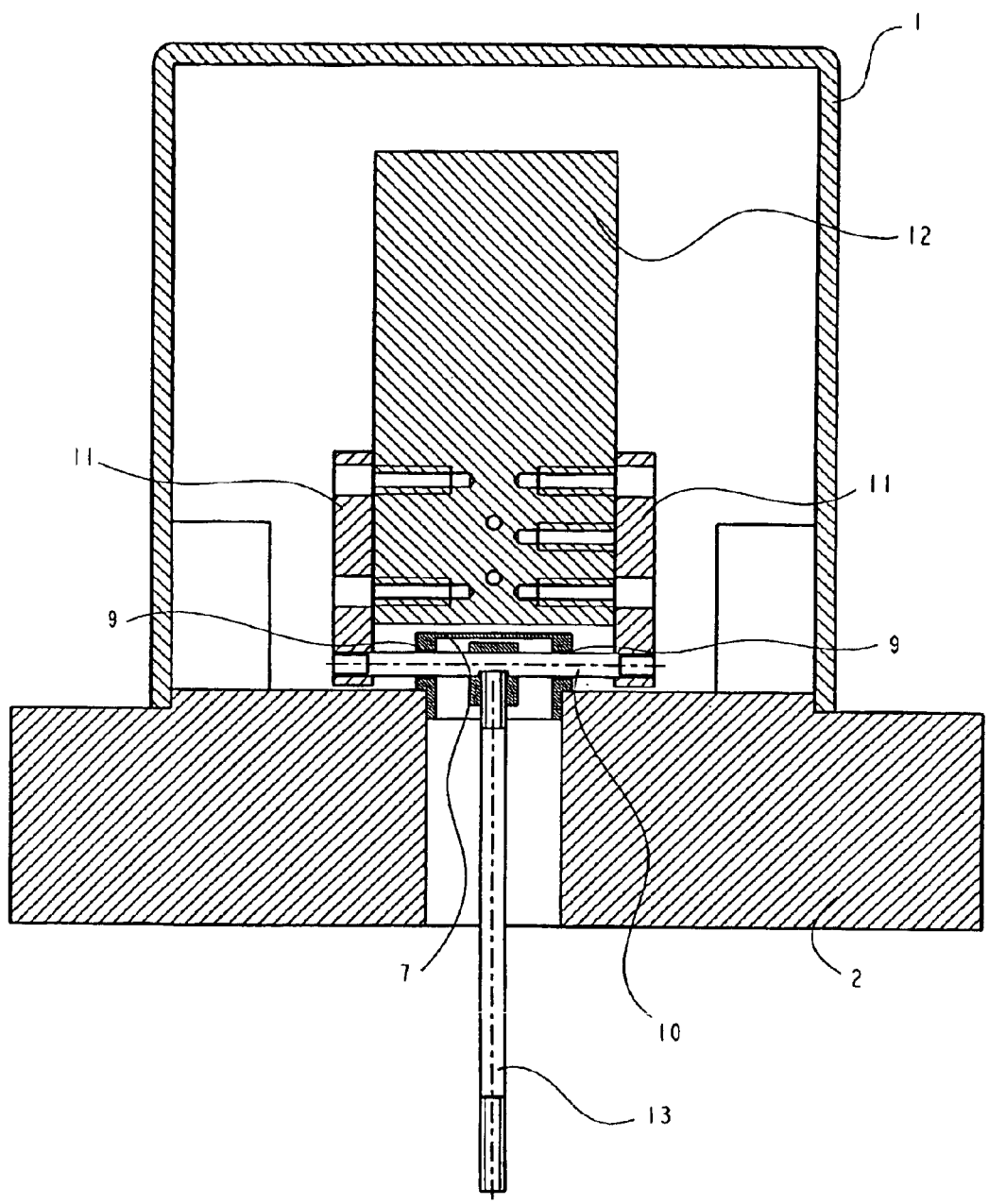
FIG. 4 represents a further embodiment of the horizontal passage for the force-transmitting rod member through the balance housing, in a sectional view as seen from the front.

In a further embodiment, which is illustrated in FIG. 4, the force-transmitting rod member 6 has a horizontal section 10 extending over the entire width of the load-hanger element 12. The horizontal section 10 traverses the balance housing through two diametrically opposed openings in the adapter flange 7 and is coupled at both ends to the load-hanger element 12 through connector elements 11 in a force-tight connection. This arrangement lends more stability to the force-transmitting rod member 6. The load-coupling piece 13 is attached at the mid-portion of the horizontal section 10.

The principle of providing a horizontal passage for the introduction of a force which, by its nature, is directed vertically, and sharing the area of the horizontal passage to also serve as the outlet for the protective gas by which the housing is kept under an above-ambient pressure is not limited to an arrangement on the underside of the balance, but is likewise applicable for an upward-oriented arrangement in a top-loading balance, or for a lateral arrangement in top-loading balances as well as balances with downward suspended pans. This is facilitated in particular by the fact that the load-coupling piece 13 does not necessarily have to be in a centered position below the load-hanger element 12.

What is claimed is:

1. An electronic balance, comprising a housing (1) that can be put under an above-ambient pressure and a force-transmitting rod member (6) passing through a vertical wall of said housing, the force transmitting rod member having a horizontal portion and a vertical portion, the housing comprising at least one inlet for a protective gas and at least one exclusively horizontal passage through said vertical housing wall for the horizontal portion of the force-transmitting rod member (6), wherein the exclusively horizontal passage is configured as at least one opening (9) in said housing wall, the horizontal portion of the force-transmitting rod member (6) passes through the opening in a contact-free manner, and the horizontal passage also forms an outlet for the protective gas, the horizontal passage being configured to permit sufficient play for vertical movement of the force transmitting rod member (6) under the weight of a sample that is being weighed and to keep a flow rate of gas streaming through the passage sufficiently small.

2. The electronic balance according to claim 1, wherein said balance is adapted for use in an environment where a risk of explosion exists.

3. The electronic balance according to claim 1, wherein at the horizontal passage of the force-transmitting rod member (6) through the opening (9), the opening (9) and the force-transmitting rod member (6) have substantially matching contour profiles and the opening surrounds the rod member with a narrow gap.

4. The electronic balance according to claim 1, wherein the opening (9) is vertically elongated into a substantially oval shape, said vertical elongation being sufficiently large so that the opening has a vertical height that is larger than a vertical movement amplitude of the force-transmitting rod member (6) that occurs when a sample is weighed on the balance.

5. The electronic balance according to claim 1, wherein the housing further comprises an adapter flange (7) that is tightly connected to the housing, said adapter flange comprising predominantly vertical flange walls, and wherein the at least one opening (9) is arranged in said vertical flange walls.

6. The electronic balance according to claim 1, wherein the force-transmitting rod member (6) comprises a single, integral unit.

7. The electronic balance according to claim 1, wherein the force-transmitting rod member (6) comprises an assembly made up of a plurality of parts and wherein one of said plurality of parts consists of at least one horizontal section (10).

8. The electronic balance according to claim 7, further comprising a load-hanger element (12) having two sides and a width measured between said two sides, wherein the at least one horizontal section (10) extends at least over said width and is coupled laterally to said sides, and wherein another of said plurality of parts comprises a load-coupling piece for a load to be weighed, said load-coupling piece being attached to a mid-portion of the at least one horizontal section (10).

9. The electronic balance according to claim 8, wherein said lateral coupling to said sides is realized through a force-tight connection by means of at least one connector element (11).

10. The electronic balance according to claim 1, further comprising a valve (15), an electronic regulating unit (14) connected to the valve (15), and a pressure sensor (5) for measuring the above-ambient pressure in one of the housing (1) and a supply conduit (16) for the protective gas, wherein said pressure sensor cooperates with the valve through the regulating unit to regulate the above-ambient pressure to a predefined level.

11. The electronic balance according to claim 10, wherein said measurement and regulation of the pressure are performed pneumatically.

12. The electronic balance according to claim 10, further comprising electrical operating elements installed in the housing (1), wherein the regulating unit (14) switches the electrical operating elements to a voltage-free state if the above-ambient pressure inside the housing (1) falls below a predefined threshold value.

13. An electronic balance, comprising a housing (1) that can be put under an above-ambient pressure and a force-transmitting rod member (6) passing through a vertical wall of said housing, the force transmitting rod member having a horizontal portion and a vertical portion, the housing comprising at least one inlet for a protective gas and at least one exclusively horizontal passage through said vertical housing wall for the horizontal portion of the force-transmitting rod member (6), wherein the exclusively horizontal passage is configured as at least one opening (9) in said housing wall, the horizontal portion of the force-transmitting rod member (6) passes through the opening in a contact-free manner, and the horizontal passage also forms an outlet for the protective gas, the horizontal passage being configured to permit sufficient play for vertical movement of the force transmitting rod member (6) under the weight of a sample that is being weighed and to keep a flow of gas streaming through the passage sufficiently small.

14. An electronic balance, comprising a housing (1) that can be put under an above-ambient pressure and a force-transmitting rod member (6) passing through a vertical wall of said housing, the force transmitting rod member having a horizontal portion and a vertical portion, the housing comprising at least one inlet for a protective gas and at least one exclusively horizontal passage through said vertical housing wall for the horizontal portion of the force-transmitting rod member (6), wherein the exclusively horizontal passage is configured as at least one opening (9) in said housing wall, the horizontal portion of the force-transmitting rod member (6) passes through the opening in a contact-free manner, and the horizontal passage also forms an outlet for the protective gas, wherein a gap of a few tenths of a millimeter is formed between the force-transmitting rod member (6) and the housing.

* * * * *